(12) United States Patent
Song et al.

(10) Patent No.: US 11,417,906 B2
(45) Date of Patent: Aug. 16, 2022

(54) CYLINDRICAL LITHIUM SECONDARY BATTERY

(71) Applicant: LG Chem, Ltd., Seoul (KR)

(72) Inventors: Han Gab Song, Daejeon (KR); An Soo Jeong, Daejeon (KR); Min Gyu Kim, Gyeonggi-do (KR); Pil Kyu Park, Daejeon (KR); So Ra Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/322,293

(22) PCT Filed: Feb. 6, 2018

(86) PCT No.: PCT/KR2018/001563
§ 371 (c)(1),
(2) Date: Jan. 31, 2019

(87) PCT Pub. No.: WO2018/147616
PCT Pub. Date: Aug. 16, 2018

(65) Prior Publication Data
US 2019/0165407 A1    May 30, 2019

(30) Foreign Application Priority Data

Feb. 9, 2017    (KR) .......................... 10-2017-0018118

(51) Int. Cl.
*H01M 10/04*    (2006.01)
*H01M 10/0525*    (2010.01)
(Continued)

(52) U.S. Cl.
CPC ....... *H01M 10/0422* (2013.01); *H01M 10/04* (2013.01); *H01M 10/0525* (2013.01);
(Continued)

(58) Field of Classification Search
CPC .... H01M 2/1235; H01M 2/1241; H01M 2/02; H01M 2/0217; H01M 2/022; H01M 10/0422; H01M 2/12–1294
See application file for complete search history.

(56) References Cited

U.S. PATENT DOCUMENTS 6,080,505 A * 6/2000 Pate .......................... H01G 9/12
429/53
6,955,187 B1    10/2005 Johnson
(Continued)

FOREIGN PATENT DOCUMENTS

CN    1747198 A    3/2006
CN    201438473 U    4/2010
(Continued)

OTHER PUBLICATIONS

KR-100542683-B1 English machine translation (Year: 2021).*
(Continued)

*Primary Examiner* — Ula C Ruddock
*Assistant Examiner* — Armindo Carvalho, Jr.
(74) *Attorney, Agent, or Firm* — Lerner, David, Littenberg, Krumholz & Mentlik, LLP (57) ABSTRACT

A cylindrical lithium secondary battery according to the present invention can reduce gas explosion by preventing gas concentration from being concentrated only on the upper top cap vent by increasing the gas spouting passage through which the inner gas of the can is spouted by forming a rupture portion of a material different from that of the can member on a part of the cylindrical can member, and when the inside or outside of the battery is exposed to a high temperature, by making, a shape-based alloy member, which causes cracking of the can member by deformation, included a part of the can member, the gas is discharged through the can vent by the cracking of the can member to prevent explosion before the tap cap safety vent operates by the
(Continued)

internal air pressure, and ignition that may be caused by heating by internal or external heat may be prevented.

15 Claims, 13 Drawing Sheets

(51) Int. Cl.
    *H01M 50/107*     (2021.01)
    *H01M 50/342*     (2021.01)
    *H01M 50/375*     (2021.01)
    *H01M 50/119*     (2021.01)

(52) U.S. Cl.
    CPC ....... *H01M 50/107* (2021.01); *H01M 50/119* (2021.01); *H01M 50/342* (2021.01); *H01M 50/3425* (2021.01); *H01M 50/375* (2021.01)

(56) References Cited

U.S. PATENT DOCUMENTS

| | | | |
|---|---|---|---|
| 8,580,439 B1 | 11/2013 | Kaiser et al. | |
| 2005/0058887 A1 | 3/2005 | Richards et al. | |
| 2006/0073375 A1* | 4/2006 | Hong | H01M 50/317 429/53 |
| 2009/0305114 A1 | 12/2009 | Yeo | |
| 2011/0003194 A1* | 1/2011 | Kwak | H01M 10/052 429/163 |
| 2012/0003517 A1* | 1/2012 | Choi | H01M 50/375 429/62 |
| 2012/0183819 A1 | 7/2012 | Yamamoto et al. | |
| 2014/0147712 A1* | 5/2014 | Lee | H01M 10/0436 429/61 |
| 2015/0155535 A1* | 6/2015 | Fujikawa | H01M 2/1223 429/54 |
| 2016/0072119 A1* | 3/2016 | Umeyama | H01M 50/3425 429/58 |
| 2018/0053961 A1 | 2/2018 | Song | |

FOREIGN PATENT DOCUMENTS

| | | |
|---|---|---|
| CN | 105070932 A | 11/2015 |
| EP | 2472634 A1 | 7/2012 |
| GN | 1665045 A | 9/2005 |
| GN | 101944632 A | 1/2011 |
| GN | 101604759 B | 11/2012 |
| JP | H10233198 A | 9/1998 |
| JP | H10269997 A | 10/1998 |
| JP | 2007501492 A | 1/2007 |
| JP | 2012190779 A | 10/2012 |
| KR | 19980019881 U | 7/1998 |
| KR | 19990004385 A | 1/1999 |
| KR | 100542683 B1 * | 1/2006 |
| KR | 100591421 B1 | 6/2006 |
| KR | 20080015164 A | 2/2008 |
| KR | 20080039091 A | 5/2008 |
| KR | 100864694 B1 | 10/2008 |
| KR | 20110035625 A | 4/2011 |
| KR | 20120136627 A | 12/2012 |
| KR | 20130019477 A | 2/2013 |
| KR | 101249918 B1 | 4/2013 |
| KR | 20140147412 A | 12/2014 |
| KR | 20150037309 A | 4/2015 |
| KR | 20160051037 A | 5/2016 |
| KR | 20170004252 A | 1/2017 |
| KR | 20170022702 A | 3/2017 |
| WO | 2013024963 A1 | 2/2013 |

OTHER PUBLICATIONS

Search report from International Application No. PCT/KR2018/001563, dated May 11, 2018.
Extended European Search Report for Application No. EP18751641 dated Mar. 4, 2019.
Chinese Search Report for Application No. 201880002487.3, dated Dec. 23, 2020, 7 pages.

* cited by examiner

Fig. 1

PRIOR ART

CYLINDRICAL LITHIUM SECONDARY BATTERY

CROSS-REFERENCE TO RELATED APPLICATIONS

This application is a national phase entry under 35 U.S.C. § 371 of International Application No. PCT/KR2018/001563, filed on Feb. 6, 2018, published in Korean, which claims priority to Korean Patent Application No. 10-2017-0018118, filed on Feb. 9, 2017, the disclosures of which are hereby incorporated herein by reference.

TECHNICAL FIELD

The present invention relates to a cylinder type lithium secondary battery, and more particularly, to a cylinder type lithium secondary battery capable of reducing gas explosion by preventing gas concentration from being concentrated only on the upper top cap vent by increasing the gas spouting passage through which the inner gas of the can is spouted by forming a rupture portion of a material different from that of the can member on a part of the cylindrical can member, capable of improving safety in preventing ignition by adding a safety device responsive to a temperature rise inside and outside of the battery, and capable of providing convenience to a manufacturer by forming the configuration of the shape memory alloy in various forms by configuring the shape memory alloy formed at a specific section of a circumference of a cylindrical can member to be selected from a specific pattern, a specific point and a straight line shape.

RELATED ART

As technologies of mobile devices are developed and the demand for such mobile devices increases, the demand for secondary batteries as an energy source has been rapidly increasing. Among such secondary batteries, many studies have been made on lithium secondary batteries having high energy density and discharge voltage, and such lithium secondary batteries have been commercialized and have been widely used.

The secondary battery includes a cylindrical battery cell in which an electrode assembly is embedded in a cylindrical or rectangular metal can, and a pouch-shaped battery cell in which a prismatic battery cell and an electrode assembly are embedded in a pouch-shaped case of an aluminum laminate sheet. Among them, the cylindrical battery cell has a relatively large capacity and is structurally stable.

The electrode assembly contained in the battery case is a chargeable and dischargeable power generation element including a positive electrode (negative electrode), a separator, and a negative electrode (positive electrode). The electrode assembly is classified into a jelly-roll type in which a separator is interposed between a positive electrode and a negative electrode coated with an active material and is wound, and a stacked type in which a plurality of positive electrodes and negative electrodes of a predetermined size are sequentially stacked with a separator interposed therebetween. Among them, the jelly-roll type electrode assembly is easy to manufacture and has an advantage of high energy density per weight.

Figure 1:
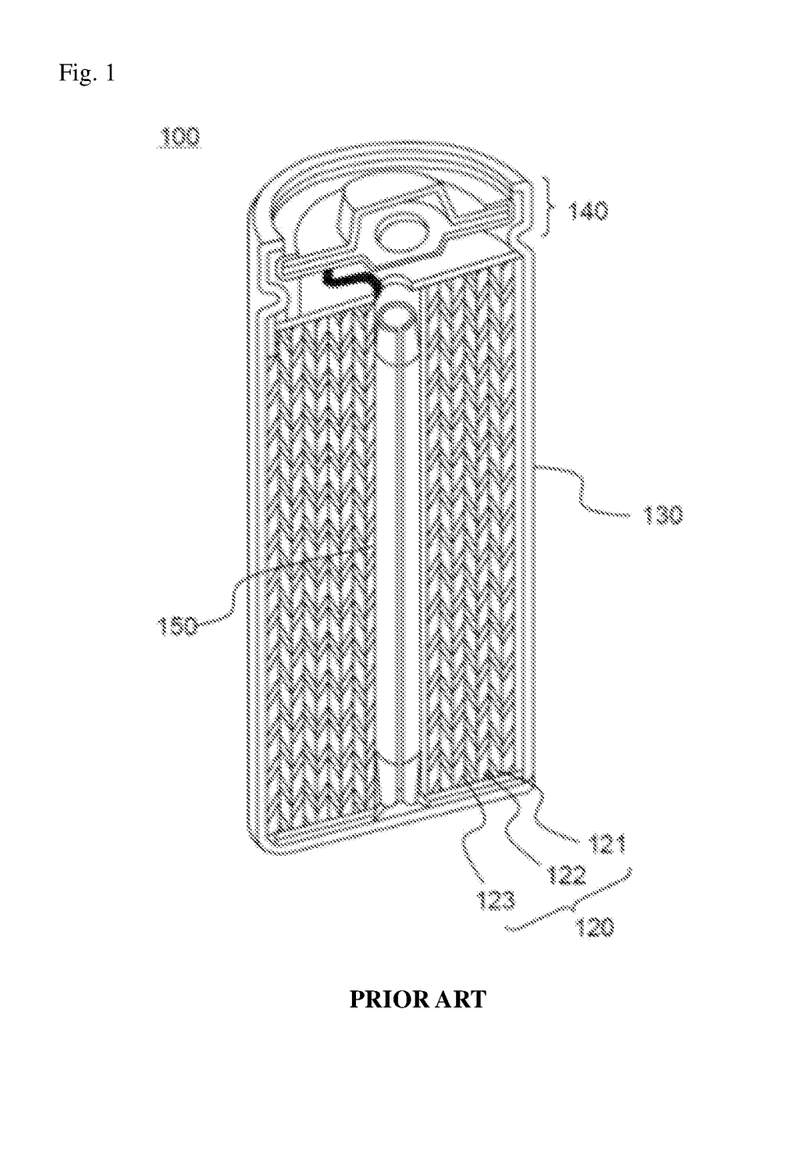
FIG. 1 is a schematic view showing a cylindrical lithium secondary battery according to the prior art.

In this regard, FIG. 1 schematically shows a vertical cross-sectional perspective view of a typical cylindrical battery cell.

Referring to FIG. 1, in order to manufacture a cylindrical battery cell 100, a jelly-roll type (wound type) electrode assembly 120 is accommodated in a cylindrical can 130, an electrolyte is injected into the cylindrical can 130, then a top cap 140 having an electrode terminal (for example, a positive electrode terminal; not shown) is coupled with the upper end of the case 130.

The electrode assembly 120 is formed of a structure that a positive electrode 121 and a negative electrode 122 and a separator 123 interposed between the positive electrode 121 and the negative electrode 122 are rolled in a round shape. A cylindrical center pin 150 is inserted into the mandrel of the electrode assembly 120. The center pin 150 is generally made of a metallic material so as to have a predetermined strength and is formed of a hollow cylindrical structure in which a plate material is bent in a round shape. The center pin 150 acts as a channel for fixing and supporting the electrode assembly and a path for discharging the gas generated by the internal reaction during charging, discharging and operation.

On the other hand, the lithium battery cell has a disadvantage of low safety. For example, when the battery is overcharged to about 4.5 V or more, decomposition reaction of the positive electrode active material occurs, dendrite growth of lithium metal occurs at the negative electrode, decomposition reaction of the electrolytic solution occurs due to interelectrode reaction. In this process, the heat is accompanied by the decomposition reaction and a number of side reactions proceed rapidly to generate a large amount of gas, thereby causing a so-called swelling phenomenon in which the battery cell swells up.

Therefore, in order to solve such a problem, in a general cylindrical battery cell, a current interrupting device (CID) and a safety vent for interrupting the current and relieving the internal pressure when the battery is operating abnormally are mounted in a space between the electrode assembly and the upper cap.

Nevertheless, such a conventional cylindrical secondary battery has a problem that when a test such as a direct thermal shock, in which a safety device such as a current interruption device (CID), a vent or the like is not given sufficient time to operate, is made, the discharge port through which the gas can be sprayed, when the high-pressure gas in the inside is momentarily discharged to the outside, is only the top cap, and thus, the discharge pressure is increased and the inner electrode assembly is discharged to the outside together with the discharge gas, thereby generating a powerful explosion.

DISCLOSURE

Technical Problem

Accordingly, it is an object of the present invention to provide a cylindrical lithium secondary battery capable of reducing gas explosion by preventing gas concentration from being concentrated only on the upper top cap vent by increasing the gas spouting passage through which the inner gas of the can is spouted by forming a rupture portion of a material different from that of the can member on a part of the cylindrical can member.

Another object of the present invention is to provide a cylindrical lithium secondary battery capable of improving safety in preventing ignition by adding a safety device responsive to a temperature rise inside and outside of the battery.

Another object of the present invention is to provide a cylindrical lithium secondary battery capable of providing convenience to a manufacturer by forming the configuration of the shape memory alloy in various forms by configuring the shape memory alloy formed at a specific section of a circumference of a cylindrical can member to be selected from a specific pattern, a specific point and a straight line shape.

Technical Solution

According to one aspect of the present disclosure, there is provided a cylinder type lithium secondary battery including: a cylinder type can member having an open upper end, an inner portion, and a shape memory alloy member included as a part of the cylinder type can member; an electrode assembly embedded with an electrolyte in the inner portion of the cylinder type can member; and a cap assembly mounted on the open upper end of the cylinder type can member, the cap assembly including a safety vent configured to discharge gas when an internal pressure of the cylinder type can member rises due to the gas, wherein the shape memory alloy member is configured to deform and crack the cylinder type can member when a temperature of the shape memory alloy member reaches a predetermined temperature.

In the present disclosure, the shape memory alloy member may include one or more shape memory alloys selected from the group consisting of a nickel-titanium alloy, a copper-zinc alloy, a gold-cadmium alloy, and an indium-thallium alloy.

In the present disclosure, the shape memory alloy member may be configured to contract at the predetermined temperature of 130° C. or higher to crack the cylinder type can member. A volume shrinkage rate of the shape memory alloy member may be 90% or less at the predetermined temperature of 130° C. or higher.

In the present disclosure, the shape memory alloy member may be configured to expand at a the predetermined temperature of 130° C. or higher to crack the cylinder type can member. A volume expansion rate of the shape memory alloy member may be 110 to 200% of a volume expansion rate of the cylinder type can member at the predetermined temperature of 130° C. or higher.

According to one exemplary embodiment of the present disclosure, the shape memory alloy member may be formed horizontally along a circumference of the cylinder type can member.

According to one exemplary embodiment of the present disclosure, the shape memory alloy member may be formed only on a part of the circumference of the cylinder type can member without completely crossing the cylinder type can member, thereby preventing the cylinder type can member from being bisected when the cylinder type can member is cracked.

According to one exemplary embodiment of the present disclosure, the shape memory alloy member may be formed along the circumference of the cylinder type can member to traverse a vertical direction of the cylinder type can member.

According to one exemplary embodiment of the present disclosure, the shape memory alloy member may be shaped in one or more patterns selected from a comb pattern, a striped pattern, a check pattern, and a criss-cross pattern.

According to one exemplary embodiment of the present disclosure, the shape memory alloy member may be shaped in one or more selected from a circular shape, a quadrangular shape, a triangular shape, an elliptical shape, and a rhombic shape.

Effect of the Invention

The cylindrical lithium secondary battery according to the present invention has the following effects.

First, a cylindrical lithium secondary battery according to the present invention can reduce gas explosion by preventing gas concentration from being concentrated only on the upper top cap vent by increasing the gas spouting passage through which the inner gas of the can is spouted by forming a rupture portion of a material different from that of the can member on a part of the cylindrical can member.

Second, according to the present invention, when the inside or outside of the battery is exposed to a high temperature of 130° C. or more, by making, a shape-based alloy member, which causes cracking of the can member by deformation, included a part of the can member, the gas is discharged through the can vent by the cracking of the can member to prevent explosion before the tap cap safety vent operates by the internal air pressure, and ignition that may be caused by heating by internal or external heat may be prevented.

Third, according to the present invention, sensitivity to temperature is higher compared to a case where a can vent is formed by simply including a material having a different thermal expansion coefficient in a part of the can member, and thus the cracking of the can member more quickly occurs and the ignition caused by the explosion can be prevented more efficiently, thereby improving safety.

DETAILED DESCRIPTION OF THE PREFERRED EMBODIMENTS

Hereinafter, exemplary embodiments of the present disclosure will be described in detail with reference to the accompanying drawings. However, the present disclosure is not limited by the following examples.

Figure 2:
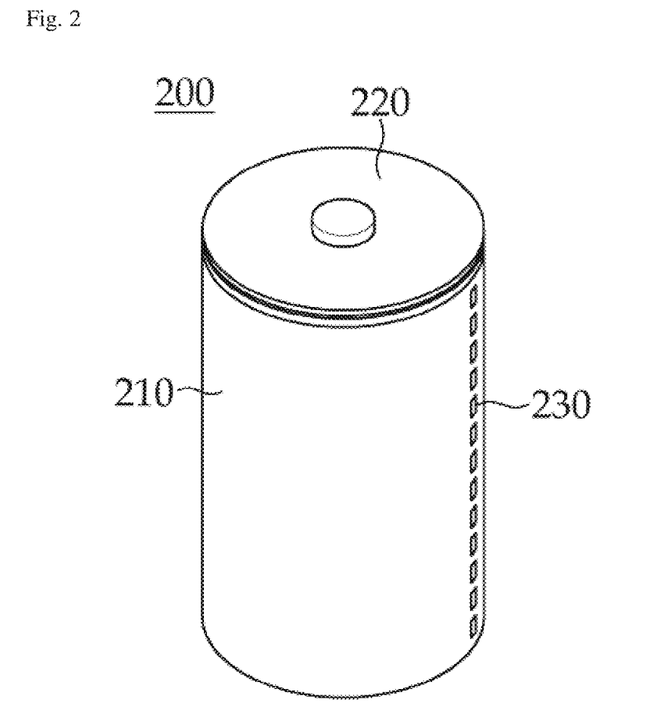
FIG. 2 is a schematic view showing a cylindrical lithium secondary battery according to an embodiment of the present invention.
Figure 3:
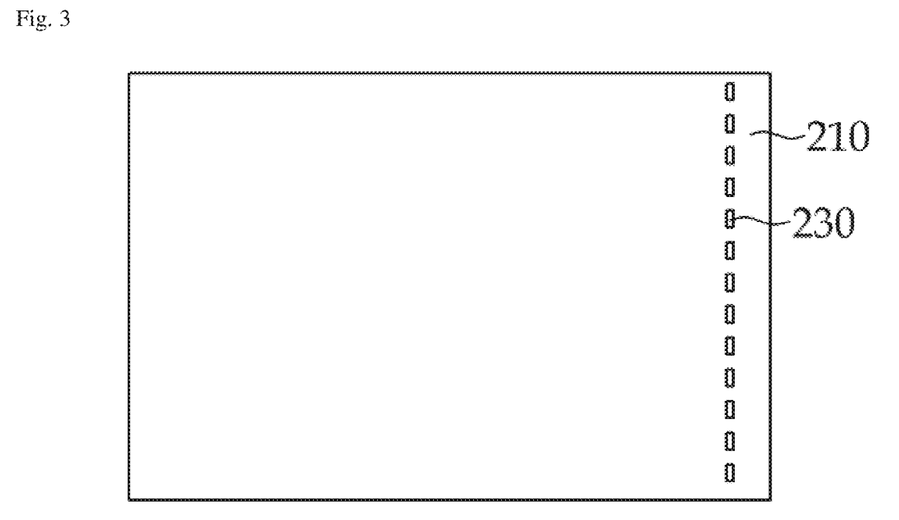
FIG. 3 is an exploded view showing a can member of FIG. 2.

FIG. 2 is a perspective view showing a secondary battery according to one embodiment of the present disclosure, and FIG. 3 is an exploded view of a can member shown in FIG. 2.

As shown in FIGS. 2 and 3, a secondary battery 200 according to one embodiment of the present disclosure includes: an electrode assembly (not shown) in which a positive electrode, a separator, and a negative electrode are laminated; the can member 210 having an inner portion in which the electrode assembly is embedded; and a cap assembly 220 including a safety vent (not shown) configured to discharge gas when an internal pressure of a cylinder type can rises due to the generated gas, and a shape memory alloy member 230, in which a shape thereof is deformed to crack the can member when the temperature reaches a specific temperature, is included as a part of the can member.

In the conventional cylinder type secondary battery, when an internal pressure rises, internal gas is discharged from one place, that is, a safety vent of a top cap, but in the secondary battery of the present disclosure, in addition to the safety vent of a top cap, a vent capable of discharging gas is formed as a part of the can member, thereby dispersing gas discharge ports to reduce a risk of explosion.

By using the shape memory alloy member, when the temperature inside or outside the secondary battery reaches to a specific temperature of 130° C. or more, the shape memory alloy member responsive to the specific temperature expands or contracts to crack the can member so that the gas inside the secondary battery may be discharged through the crack and ignition may be prevented. That is, a safety device against a temperature rise in addition to an increase in an internal air pressure is added.

The shape memory alloy member according to one embodiment of the present disclosure may be restored to its original shape after being expanded or contracted according to a temperature, and may include one, or two or more selected from the group consisting of a nickel-titanium alloy, a copper-zinc alloy, a gold-cadmium alloy, and an indium-thallium alloy.

In the present disclosure, the can member refers to a side surface corresponding to a column of the cylinder type secondary battery 200 other than an upper surface and a lower surface of the battery, and a material of the can member may include a steel or the like which is used as a material of a can member of a typical secondary battery.

In the present disclosure, the shape memory alloy member is included as a part of the can member and the shape memory alloy is sensitive to a specific temperature, and thus the shape memory alloy member may effectively crack the can member even at a minimum rate in comparison with the case in which materials with different thermal expansion coefficients are used.

In one embodiment of the present disclosure, an area in which the shape memory alloy member is included in the can member may be 5% to 20% of an area of the entire can member, and more preferably, may be 10% to 20%. When the area in which the shape memory alloy member is included in the can member is less than 5%, the area may be insufficient to achieve the object of the present disclosure, and when the area exceeds 20%, it is not preferable in terms of economic feasibility and morphological stability.

When heat is applied to the can member during a test in which thermal shock is directly applied, a process in which the can member is cracked by the shape memory alloy member will be described in more detail.

A shape memory alloy member has a case of contracting and a case of expanding in response to a specific temperature, and first, the case in which the shape memory alloy contracting at the specific temperature is applied will be described. The shape memory alloy member contracting at the specific temperature is reduced in volume by heat while the can member tends to expand, so that a crack is generated between the shape memory alloy member and the can member and the internal gas may be discharged through the crack.

In one embodiment of the present disclosure, the shape memory alloy member may contract at a temperature of 130° C. or higher to crack the can member. Here, a volume shrinkage rate of the shape memory alloy member may be 90% or less at a temperature of 130° C. or higher, and more preferably, may be 75% or less.

On the other hand, when the shape memory alloy member expands at the specific temperature, the process of cracking the can member is as follows. When the shape memory alloy member is expanded by heat, an expansion volume of the shape memory alloy member may be different from that of the can member. That is, although the volume of the shape memory alloy member greatly increases due to heat, a volume expansion rate of the can member does not follow a volume expansion rate of the shape memory alloy member so that a crack occurs between the can member and the shape memory alloy member.

Here, the volume expansion rate of the shape memory alloy member at a temperature of 130° C. or higher may be 110 to 200% of that of the can member, and more preferably may be 130 to 200%.

A typical can member used for a secondary battery has a property of expanding in volume at a high temperature, and accordingly, when a shape memory alloy contracting in response to a high temperature is used as a part of a can member, the volume of the can member expands while the shape memory alloy contracts so that a crack may be more easily generated.

However, even when a shape memory alloy which expands in volume in response to a high temperature is used, since a volume expansion rate of the shape memory alloy member is greater than that of the can member, the can member may be sufficiently cracked to discharge gas.

The shape memory alloy has a property in which volume thereof rapidly expands or contracts in response to a specific temperature. Accordingly, when the shape memory alloy is included as a part of the can member as in the present disclosure, the can member may be broken more quickly in comparison with the case in which a material having a thermal expansion coefficient different from that of the can member is included as a part of the can member.

As described above, it is possible to quickly respond to the temperature change of the can member by configuring a part of the can member with a shape memory alloy material, and thus a safety of the secondary battery may be improved. Further, when gas discharge ports are formed in the safety vent and the can member of the cap assembly, an air pressure at the time of ejecting high pressure gas decreases and explosive power decreases, thereby securing the safety of the secondary battery.

Figure 8:
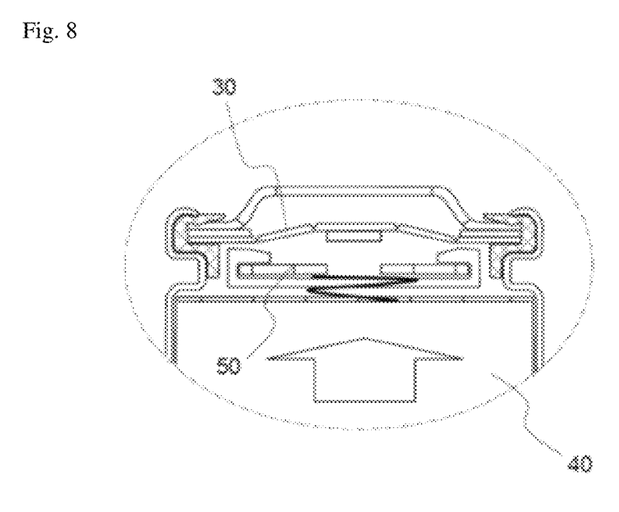
Figure 9:
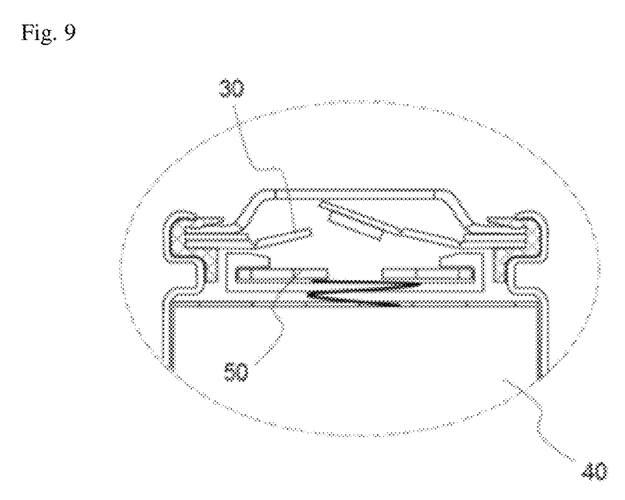

A top cap assembly according to one embodiment of the present disclosure will be described with reference to FIGS. 7 to 9.

Referring to these drawings, a top cap 10 protrudes to form a positive terminal and a discharge port is perforated therein, and a positive temperature coefficient (PTC) element 20 which cuts off a current due to a significant increase in battery resistance when a temperature inside a battery rises, a safety vent 30 which has a downward protruding shape in a normal state and is burst while protruding when a pressure inside the battery rises to discharge gas, and a connection plate 50 having one side of an upper end coupled to the safety vent 30 and one side of a lower end connected to a positive electrode of an electrode assembly 40 are sequentially disposed under the top cap 10.

Accordingly, under normal operating conditions, the positive electrode of the electrode assembly 40 is connected to the top cap 10 via a lead 42, the connection plate 50, the safety vent 30 and the PTC element 20 to run a current.

However, when gas is generated from the electrode assembly 40 side due to causes such as overcharging to increase an internal pressure, the safety vent 30 protrudes upward while a shape thereof is being reversed as shown in FIG. 3. Here, the safety vent 30 is separated from the connection plate 50 to cut off the current or burst while protruding when the pressure rises to discharge the gas to the outside as shown in FIG. 9, thereby securing safety.

In the conventional secondary battery, a gas discharge port is one place, that is, a safety vent included in a top cap assembly, but in the present disclosure, a can vent is formed in addition to the safety vent in the top cap assembly to reduce a risk of explosion and prevent ignition by explosion by dispersing the gas discharge port to two places.

In particular, when a fire occurs due to one defective battery during a manufacturing process of a secondary battery, temperature of adjacent batteries may be increased by radiant heat. However, in the case of the secondary battery having a top cap vent and the can vent as in the present disclosure, the can member is cracked by the shape memory alloy member reacting at a temperature of 130° C. or higher and thus the explosion may be prevented, thereby preventing chain explosion and ignition.

Figure 4:
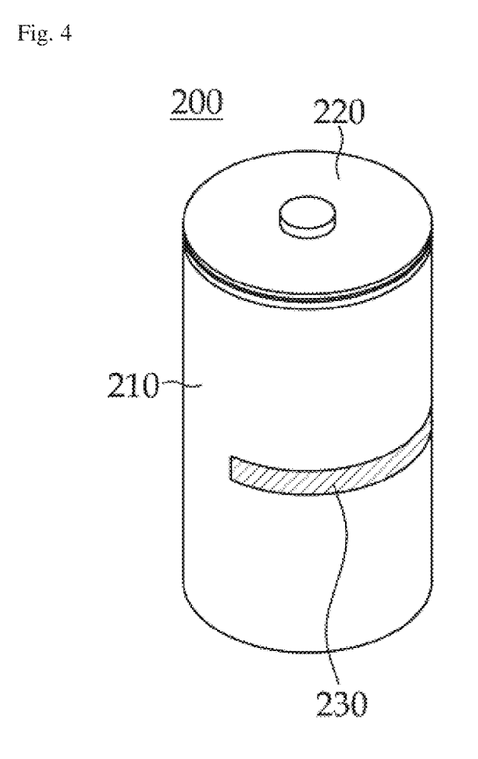
FIG. 4 is a schematic view showing a cylindrical lithium secondary battery according to another embodiment of the present invention.
Figure 5:
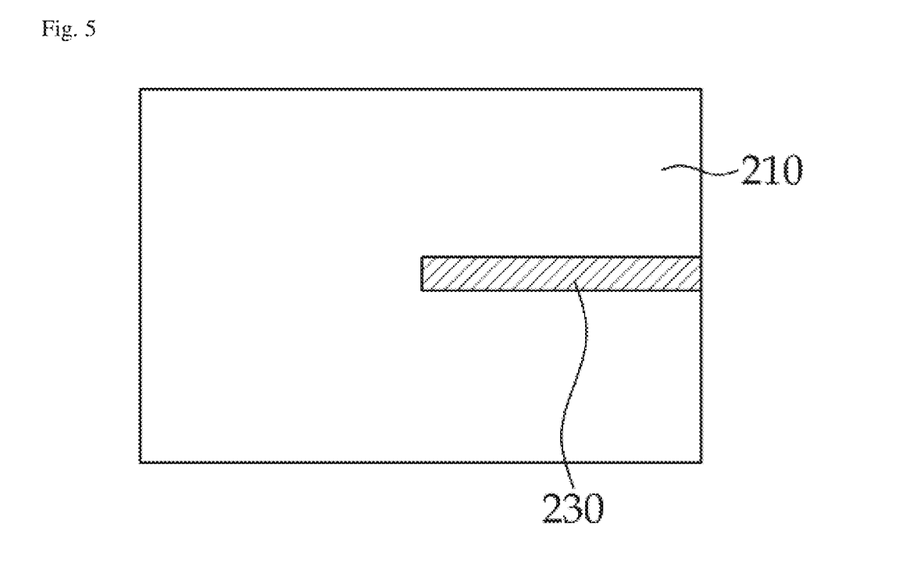
FIG. 5 is an exploded view showing a can member of FIG. 4.

FIG. 4 is a perspective view showing a secondary battery according to another embodiment of the present disclosure, and FIG. 5 is an exploded view showing a can member in FIG. 4.

As shown in FIGS. 3 and 4, in the secondary battery according to another embodiment of the present disclosure, a shape memory alloy member 230 may be formed horizontally along a circumference of a can member 210.

Here, the shape memory alloy member 230 may be formed only on a part of the circumference the can member 210 without completely crossing the can member 210, thereby preventing the can member 210 from being bisected when the can member 210 is cracked.

Figure 6A:
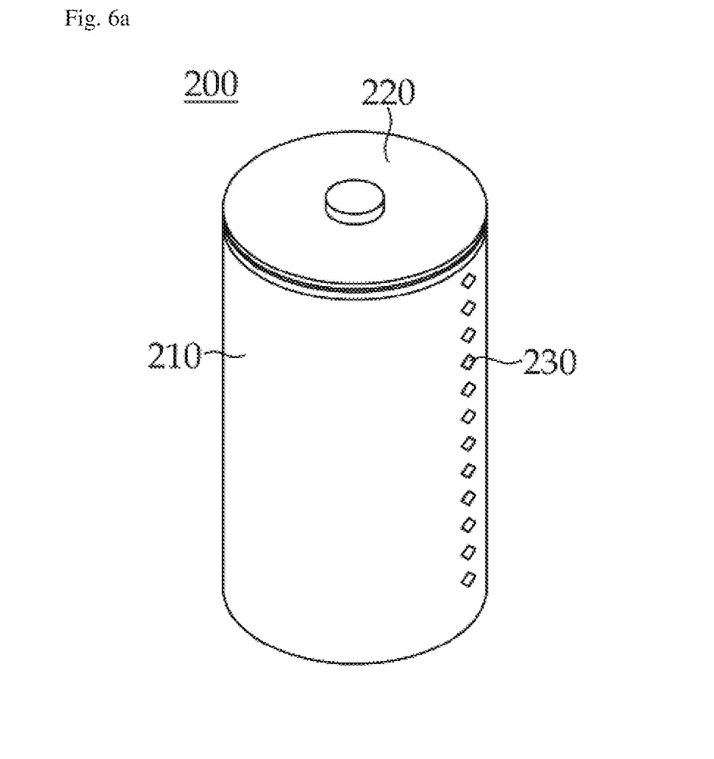
FIGS. 6A to 6C are views showing a shape memory alloy formed in a pattern of a specific type, a point of a specific type, and a form of a straight line in a specific section around the inside of the cylindrical can member in a cylindrical lithium secondary battery according to another embodiment of the present invention.
Figure 6B:
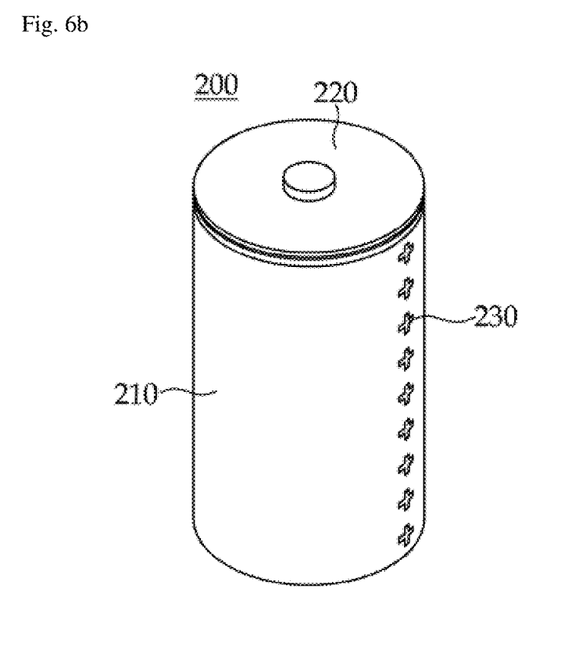
Figure 6C:
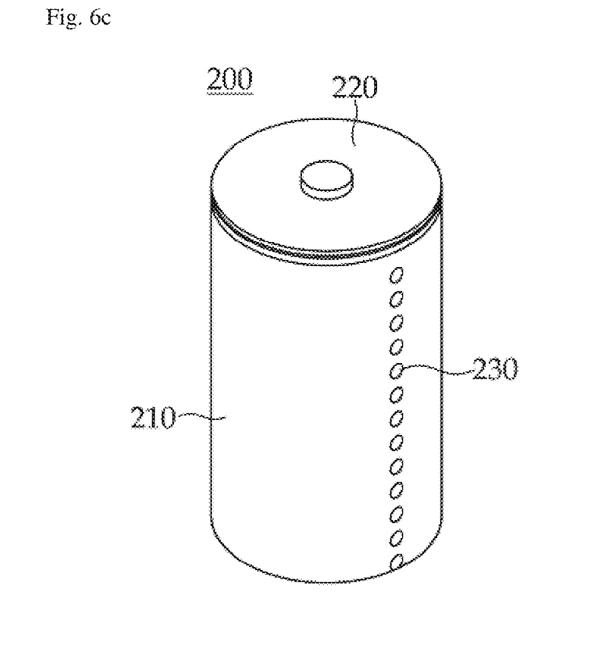

In a cylinder type lithium secondary battery according to one embodiment of the present disclosure, FIGS. 6A to 6C are views each showing that the shape memory alloy member 230 is formed in a specific region inside the circumference of the cylinder type can member 210 in a shape configured of a specific shaped pattern, a specific shaped point, and a linear shape The shape memory alloy member 230 is formed in the specific region inside the circumference of the cylinder type can member 210, and is configured by selecting from the specific shaped pattern, the specific shaped point, and the linear shape.

The specific shaped pattern configured in the shape memory alloy member 230 may be one or a plurality of patterns selected from a comb pattern, a striped pattern, a check pattern, and a criss-cross pattern as shown in FIGS. 6A to 6C, and the specific shaped point configured in the shape memory alloy member 230 may be one or a plurality of shapes selected from a circular shape, a quadrangular shape, a triangular shape, an elliptical shape, and a rhombic shape.

Hereinafter, effects of the secondary battery according to the present disclosure will be described through Examples, Comparative Examples and Experimental Examples. However, components of a secondary battery used in Examples and Comparative Examples, for example, a positive electrode active material, a negative electrode active material, an electrolyte, a separator, or the like are illustrative examples for easily explaining the present disclosure. Accordingly, components of the secondary battery of the present disclosure are not limited to the components used in the Examples and the Comparative Examples, and a scope of the present disclosure is not limited thereto.

<Manufacture of Electrode Assembly>

A negative electrode slurry was manufactured using carbon as a negative electrode active material, carbon black as a conductive material, and styrene-butadiene rubber (SBR) and carboxylmethyl cellulose (CMC) as binders, and the slurry was applied on a 10 μm thick Cu foil, followed by drying and rolling to manufacture a negative electrode. A positive electrode slurry was manufactured using Ni-rich NMC composite oxide as a positive electrode active material, carbon black as a conductive material and polyvinylidene fluoride (PVdF) as a binder, and the slurry was applied on 15 μm thick Al foil, followed by drying and rolling to manufacture a positive electrode. A separator film was interposed between the positive electrode and the negative electrode, and then wound to manufacture a jelly-roll type electrode assembly.

EXAMPLE

Figure 7:
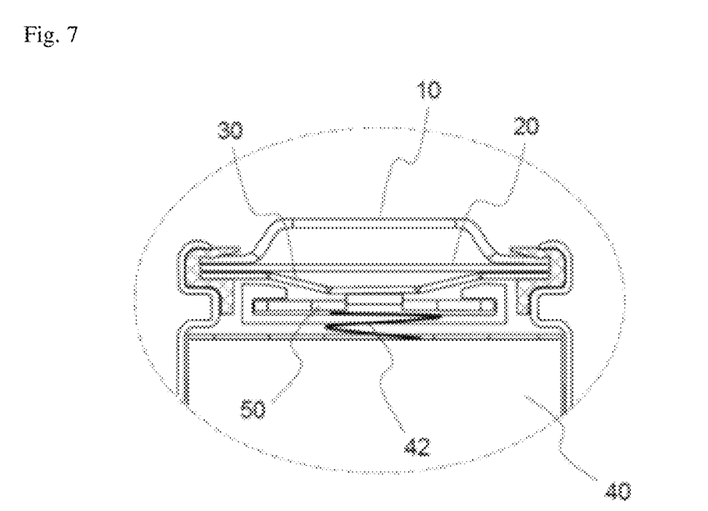
FIGS. 7 to 9 are schematic views of a cap assembly according to an embodiment of the present invention.

A cylinder type secondary battery was manufactured by accommodating the manufactured electrode assembly together with an electrolyte in a cylinder type can including a cap assembly structure shown in FIG. 7 and a can member shown in FIGS. 2 and 3. Here, a shape memory alloy member included as a part of a can member made of a steel material is a nickel-titanium alloy, and the shape memory alloy member expands at a temperature of 130° C. or higher and has a volume expansion rate of 130% of a volume expansion rate of the can member.

Comparative Example

The cylinder type secondary battery was manufactured in the same manner as in Example except that the entire can member was made of a general steel material.

Experimental Example

Figure 10A:
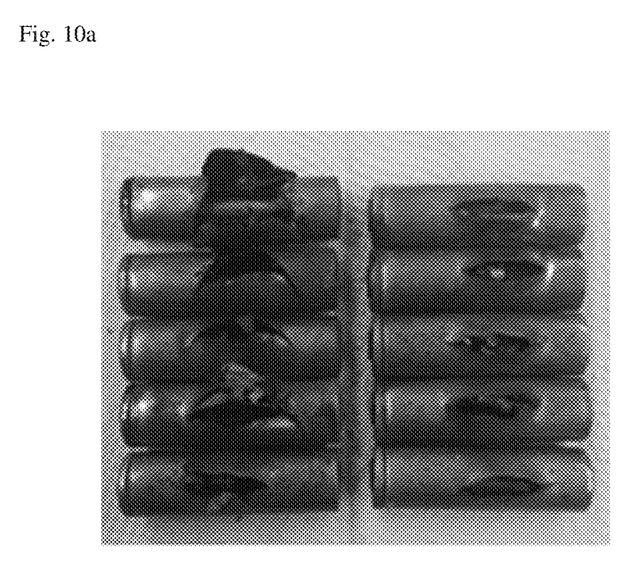
FIG. 10A is a photograph of the shape of a cylindrical secondary battery after a thermal shock test is performed according to an embodiment of the present invention.
Figure 10B:
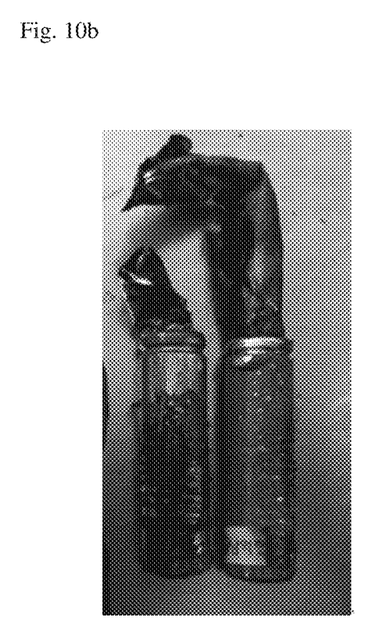
FIG. 10B is a photograph of the shape of a cylindrical secondary battery after a thermal shock test is performed according to a comparative example.

The secondary batteries of Example and Comparative Example were allowed to stand at a temperature of 135° C. for 10 minutes, and ignition in the secondary batteries was checked with a naked eye, and the results are shown in FIGS. 10A and 10B.

As shown in FIG. 10A, in the secondary batteries of Example, the can member expanded and cracked, and a top cap vent operated together with a safety device so that explosive power decreased and ignition did not occur. However, as shown in FIG. 10B, temperature of the secondary batteries was increased, an internal pressure was increased to cause ignition, and the electrode assembly was pushed out of the can, and thus it was confirmed that the explosive power was larger than in Example.

As described above, the secondary battery of the present disclosure is considered to be improved in safety because the can member is cracked due to an external temperature and a plurality of gas discharge ports are formed, thereby reducing explosive power and preventing ignition.

The invention claimed is:

1. A cylindrical lithium secondary battery, comprising:
a cylindrical can member having a cylindrical sidewall extending along a longitudinal axis between a lower end wall and an open upper end, the can member having an outer surface area and defining an inner portion therein surrounded by the cylindrical sidewall, the can member including the sidewall formed of a first material and having a shape memory alloy member positioned on and formed as a part of the sidewall of the can member such that the shape memory alloy member defines a portion of the outer surface area of the can member along the sidewall;
an electrode assembly positioned with an electrolyte in the inner portion of the can member; and
a cap assembly mounted on the open upper end of the can member, the cap assembly comprising a safety vent configured to discharge gas from the inner portion when an internal pressure of the can member rises due to the gas,
wherein, at a predetermined temperature, the shape memory alloy member deforms differently than the first material so as to permanently rupture the sidewall by forming an opening in the cylindrical sidewall between the first material and the shape memory alloy member, such that the gas in the inner portion can be discharged through the opening.

2. The battery of claim 1, wherein the shape memory alloy member includes one or more shape memory alloys selected from the group consisting of a nickel-titanium alloy, a copper-zinc alloy, a gold-cadmium alloy, and an indium-thallium alloy.

3. The battery of claim 1, wherein the shape memory alloy member is configured to contract at the predetermined temperature of 130° C. or higher to form the opening.

4. The battery of claim 1, wherein the shape memory alloy member is configured to expand at the predetermined temperature of 130° C. or higher to form the opening.

5. The battery of claim 3, wherein a volume shrinkage rate of the shape memory alloy member is 90% or less at the predetermined temperature of 130° C. or higher.

6. The battery of claim 4, wherein a volume expansion rate of the shape memory alloy member is 110 to 200% of a volume expansion rate of the first material of the can member at the predetermined temperature of 130° C. or higher.

7. The battery of claim 1, wherein the shape memory alloy member is elongated along a longitudinal dimension, the longitudinal dimension of the shape memory alloy member extending horizontally along a circumference of the sidewall of the can member.

8. The battery of claim 7, wherein the shape memory alloy member extends along a portion of the circumference of the sidewall of the can member without extending around the entire circumference of the sidewall of the can member, so as to prevent the can member from being bisected when the opening is formed.

9. The battery of claim 1, wherein the shape memory alloy member is elongated along a longitudinal dimension, the longitudinal dimension of the shape memory alloy member extending along a circumferential direction of the sidewall of the can member, the circumferential direction of the sidewall being defined about the longitudinal axis of the can member.

10. The battery of claim 1, wherein the shape memory alloy member is shaped in one or more patterns selected from a comb pattern, a striped pattern, a check pattern, and a criss-cross pattern.

11. The battery of claim 1, wherein the shape memory alloy member is shaped in one or more selected from a circular shape, a quadrangular shape, a triangular shape, an elliptical shape, and a rhombic shape.

12. The battery of claim 1, wherein the first material of the can member is a rigid material.

13. The battery of claim 12, wherein the rigid material is steel.

14. The battery of claim 1, wherein the portion of the outer surface area defined by the shape memory alloy member is from 5% to 20% of the outer surface area of the can member.

15. The battery of claim 14, wherein the portion of the outer surface area defined by the shape memory alloy member is from 10% to 20% of the outer surface area of the can member.

* * * * *